(12) United States Patent
Guigo et al.

(10) Patent No.: US 7,322,151 B2
(45) Date of Patent: Jan. 29, 2008

(54) FISHING LURE HAVING STABILIZING WINGS ALONG EACH SIDE OF THE LURE BODY

(75) Inventors: Philippe Guigo, Discovery Bay (HK); Andrew Jones, Westville (ZA); Stephen Gibson, Columbia, SC (US)

(73) Assignee: Normark INnovations, Columbia, SC (US)

( * ) Notice: Subject to any disclaimer, the term of this patent is extended or adjusted under 35 U.S.C. 154(b) by 244 days.

(21) Appl. No.: 11/132,105

(22) Filed: May 18, 2005

(65) Prior Publication Data

US 2006/0288631 A1    Dec. 28, 2006

(51) Int. Cl.
*A01K 85/00* (2006.01)
(52) U.S. Cl. .................. 43/42.26; 43/42.24; 43/42.37; 43/42.39
(58) Field of Classification Search ............... 43/42.24, 43/42.26, 42.27, 42.39, 42.37, 42.2, 42.21, 43/42.51
See application file for complete search history.

(56) References Cited

U.S. PATENT DOCUMENTS

| | | | | |
|---|---|---|---|---|
| 295,350 | A | * | 3/1884 | Chapman ..................... 43/42.2 |
| 360,339 | A | * | 3/1887 | Cooke ......................... 43/42.39 |
| 865,683 | A | * | 9/1907 | Credlebaugh .............. 43/42.26 |
| 998,238 | A | * | 7/1911 | Dineen ........................ 43/42.2 |
| 1,321,850 | A | * | 11/1919 | Rhodes ....................... 43/42.39 |
| 1,598,786 | A | * | 9/1926 | Romadke ................... 43/42.26 |
| 1,611,117 | A | * | 12/1926 | Kearns ...................... 43/42.26 |
| 1,828,574 | A | * | 10/1931 | Neukam .................... 43/42.26 |
| 1,975,218 | A | * | 10/1934 | Worden ..................... 43/42.37 |
| 2,152,948 | A | * | 4/1939 | Bocchino .................. 43/42.24 |
| 2,223,591 | A | * | 12/1940 | Andersson ................. 43/42.51 |
| 2,239,802 | A | * | 4/1941 | Westby ...................... 43/42.39 |
| 2,516,039 | A | * | 7/1950 | Wysack ..................... 43/42.37 |
| 2,557,516 | A | * | 6/1951 | Schipper ................... 43/42.39 |
| 2,561,515 | A | * | 7/1951 | Keeler ........................ 43/42.39 |
| 2,605,577 | A | * | 8/1952 | Waugler .................... 43/42.39 |
| 2,644,265 | A | * | 7/1953 | Stettner ..................... 43/42.39 |
| D175,545 | S | * | 9/1955 | Haynes ...................... 43/42.21 |
| 2,747,318 | A | * | 5/1956 | Bailey ........................ 43/42.51 |
| 2,776,518 | A | * | 1/1957 | Felmlee .................... 43/42.24 |
| 2,820,314 | A | * | 1/1958 | Scott ......................... 43/42.39 |
| 2,847,791 | A | * | 8/1958 | Simmons .................. 43/42.26 |
| 2,878,612 | A | * | 3/1959 | Netherton et al. ......... 43/42.39 |

(Continued)

FOREIGN PATENT DOCUMENTS

GB    2299739 A    10/1966

(Continued)

*Primary Examiner*—Darren W. Ark
(74) *Attorney, Agent, or Firm*—Dority & Manning, P.A.

(57) ABSTRACT

A fishing lure having stabilizing wing-like fins along each side of the lure body is generally described. Stabilizing wing-like fins allow the lure to be trolled or retrieved under the water surface while remaining upright and swimming in a life-like motion. The stabilizing wings define a top surface and a bottom surface. The top surface is substantially perpendicular to the lure body. The bottom surface twists along an arcuate line from a plane that begins acute to the side surface of the lure body to a plane that is substantially perpendicular to the side section of the lure body. The lure can also include a diving element towards the head section of the lure. The diving element can be a weight located within the head section of the lure.

11 Claims, 2 Drawing Sheets

U.S. PATENT DOCUMENTS

| | | | | |
|---|---|---|---|---|
| 2,932,916 A * | 4/1960 | Strickland | | 43/42.28 |
| 2,986,838 A * | 6/1961 | Smyser | | 43/42.39 |
| 3,035,367 A * | 5/1962 | Troyer | | 43/42.2 |
| 3,043,042 A * | 7/1962 | Mutti | | 43/42.51 |
| 3,093,923 A * | 6/1963 | Jackson | | 43/42.2 |
| 3,105,317 A * | 10/1963 | Fox | | 43/42.26 |
| 3,230,656 A * | 1/1966 | Kozjak | | 43/42.1 |
| 3,432,957 A * | 3/1969 | Marino | | 43/42.2 |
| 3,445,953 A * | 5/1969 | Dailey | | 43/42.26 |
| 3,494,063 A * | 2/1970 | Treaster | | 43/42.21 |
| 3,533,183 A * | 10/1970 | Treaster | | 43/42.21 |
| 3,611,614 A * | 10/1971 | Ward | | 43/42.24 |
| 3,693,275 A * | 9/1972 | Craig | | 43/42.39 |
| 3,744,175 A | 7/1973 | Bellah et al. | | |
| 3,861,073 A * | 1/1975 | Thomassin | | 43/42.24 |
| 3,861,075 A * | 1/1975 | Ingram | | 43/42.26 |
| 3,922,811 A * | 12/1975 | Ellingson | | 43/42.39 |
| 3,940,871 A * | 3/1976 | Evans | | 43/43.13 |
| 3,946,513 A | 3/1976 | Seliga | | |
| 3,958,358 A * | 5/1976 | Firmin | | 43/42.27 |
| 3,971,152 A * | 7/1976 | Husson, Jr. | | 43/42.06 |
| 3,973,350 A | 8/1976 | England | | |
| D243,954 S * | 4/1977 | Raquel | | D22/145 |
| 4,214,396 A | 7/1980 | Firmin | | |
| D256,268 S * | 8/1980 | Green et al. | | D22/126 |
| 4,231,179 A | 11/1980 | Hillesland | | |
| D258,833 S * | 4/1981 | Yano | | D22/128 |
| 4,317,305 A * | 3/1982 | Firmin | | 43/42.26 |
| 4,594,806 A * | 6/1986 | Brown | | 43/42.27 |
| 4,790,100 A * | 12/1988 | Green, Sr. | | 43/42.26 |
| 4,858,370 A * | 8/1989 | Ryder | | 43/42.26 |
| 4,926,578 A * | 5/1990 | Morse et al. | | 43/42.26 |
| 5,016,387 A | 5/1991 | Beaupre | | |
| 5,088,226 A * | 2/1992 | Bazinet | | 43/42.03 |
| 5,094,026 A * | 3/1992 | Correll et al. | | 43/42.28 |
| 5,133,148 A | 7/1992 | Lawson | | |
| 5,170,580 A * | 12/1992 | Rosenblatt | | 43/42.06 |
| D332,989 S * | 2/1993 | Brown | | D22/128 |
| 5,193,299 A * | 3/1993 | Correll et al. | | 43/42.24 |
| 5,197,221 A * | 3/1993 | Kresl | | 43/42.39 |
| 5,276,993 A * | 1/1994 | Rosenblatt | | 43/42.24 |
| 5,309,665 A * | 5/1994 | Franciskovich | | 43/42.26 |
| 5,428,917 A * | 7/1995 | Cunningham | | 43/42.21 |
| 5,524,380 A * | 6/1996 | Hnizdor | | 43/42.37 |
| 5,625,975 A * | 5/1997 | Imes | | 43/42.26 |
| 5,640,798 A * | 6/1997 | Garst | | 43/42.26 |
| 5,678,350 A * | 10/1997 | Moore | | 43/42.37 |
| 5,806,234 A * | 9/1998 | Nichols | | 43/42.37 |
| 5,894,692 A * | 4/1999 | Firmin | | 43/42.24 |
| 5,924,236 A | 7/1999 | Preston | | |
| 5,934,008 A * | 8/1999 | Rice | | 43/42.26 |
| 5,987,805 A * | 11/1999 | Laney | | 43/42.37 |
| 6,061,949 A * | 5/2000 | Fairchild | | 43/42.26 |
| D429,310 S * | 8/2000 | DiLiberti | | D22/132 |
| 6,170,191 B1 * | 1/2001 | Laney | | 43/43.13 |
| 6,173,523 B1 * | 1/2001 | Johnson | | 43/42.26 |
| 6,363,651 B1 * | 4/2002 | Garst | | 43/42.26 |
| 6,385,896 B1 | 5/2002 | Thomassin | | |
| 6,393,757 B2 * | 5/2002 | Bomann | | 43/42.24 |
| 6,446,381 B1 * | 9/2002 | Firmin | | 43/42.26 |
| 6,546,666 B2 * | 4/2003 | Schultz et al. | | 43/42.39 |
| 6,804,910 B1 | 10/2004 | Sharp | | |
| 6,857,220 B2 * | 2/2005 | King | | 43/42.24 |
| 6,912,808 B1 * | 7/2005 | Mak | | 43/42.39 |
| 6,922,938 B1 * | 8/2005 | Ciuffo | | 43/42.28 |
| 6,922,939 B2 * | 8/2005 | Moorhouse | | 43/42.24 |
| 7,076,911 B2 * | 7/2006 | Thorne | | 43/42.26 |
| 7,080,476 B2 * | 7/2006 | King | | 43/42.24 |
| 7,185,457 B2 * | 3/2007 | Nichols | | 43/42.39 |
| 2001/0047610 A1 | 12/2001 | Grindley | | |
| 2003/0046858 A1 * | 3/2003 | Meraw | | 43/42.28 |
| 2003/0131521 A1 | 7/2003 | Steeves | | |
| 2006/0117642 A1 * | 6/2006 | Huddleston | | 43/42.24 |

FOREIGN PATENT DOCUMENTS

| | | | |
|---|---|---|---|
| JP | 1-277440 A | * | 11/1989 |
| JP | 10-117635 A | * | 5/1998 |
| JP | 10-136834 A | * | 5/1998 |

* cited by examiner

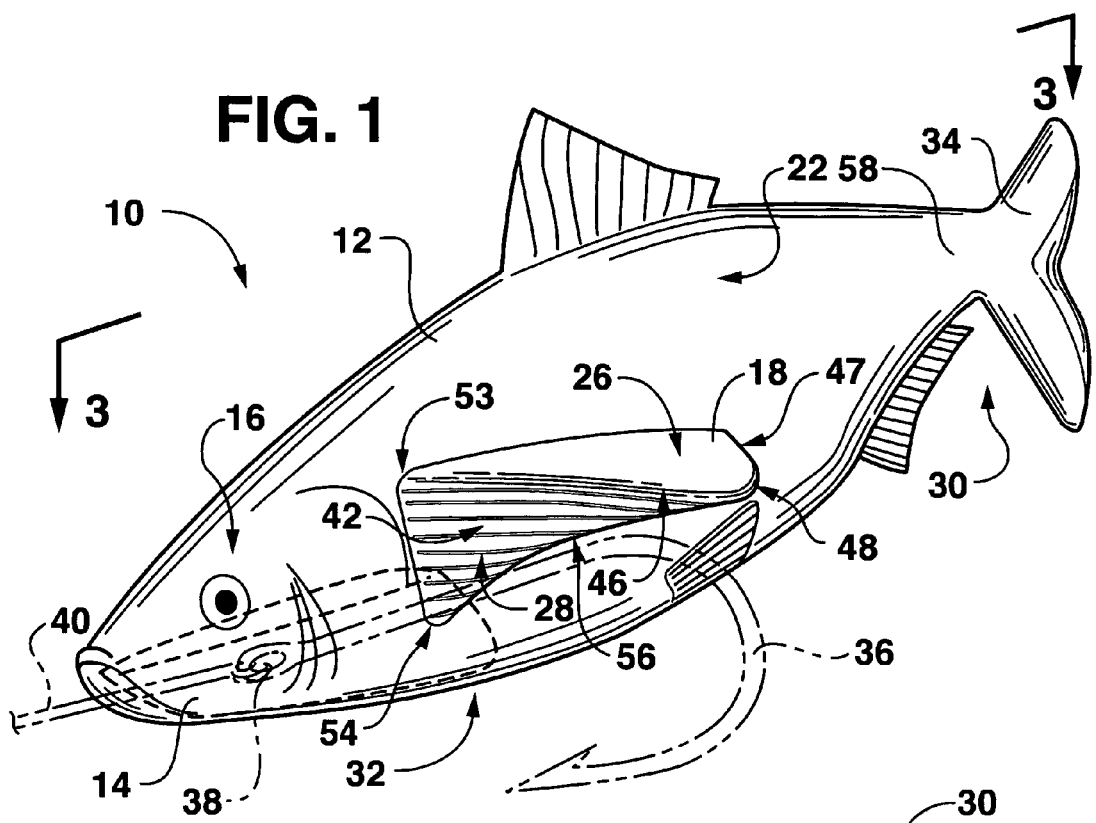
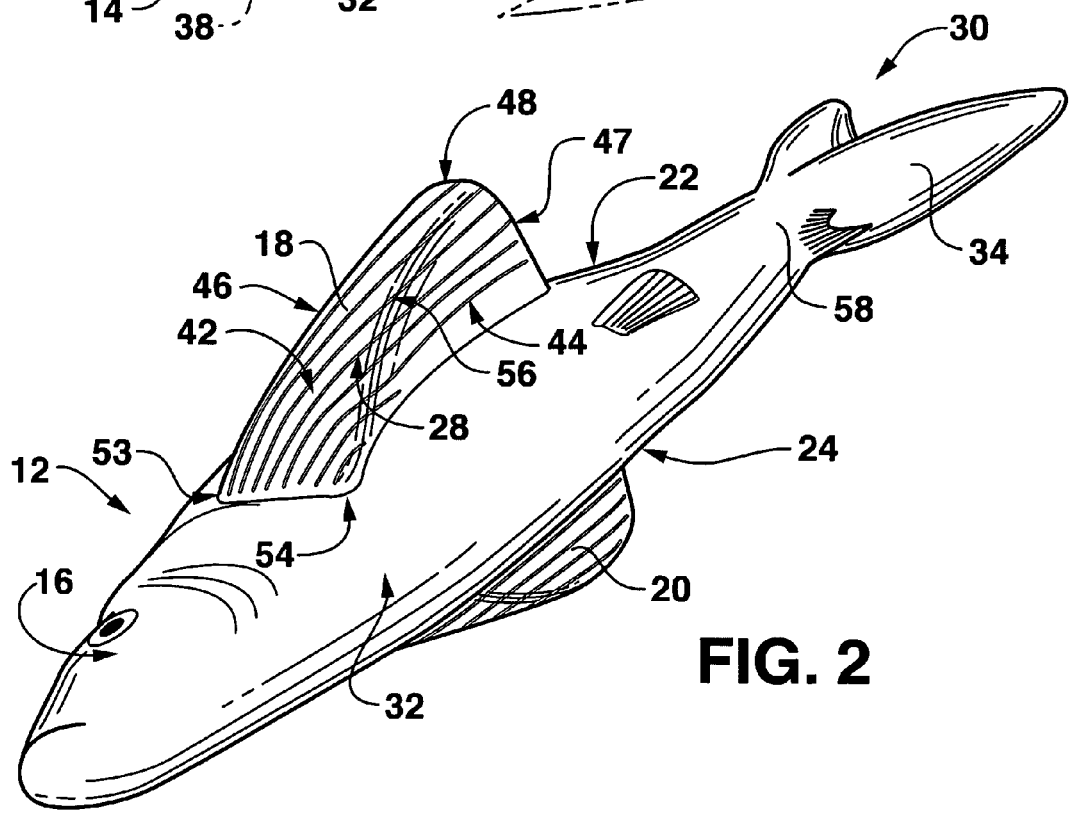

FISHING LURE HAVING STABILIZING WINGS ALONG EACH SIDE OF THE LURE BODY

TECHNICAL FIELD OF THE INVENTION

The present invention relates to fishing lures. More specifically, the present invention relates to a fishing lure having stabilizing wing-like fins along each side of the lure body. The stabilizing wing-like fins allow the lure to be trolled or retrieved under the water surface while remaining upright. The lure is also capable of being trolled at high speeds while remaining submerged beneath the water surface.

BACKGROUND OF THE INVENTION

Sport fishing is enjoyed around the world. From fresh water to salt water, a wide variety of fish species exist. Fishermen employ a variety of equipment and tackle depending upon the water being fished, the time of day, the species of fish sought, personal choice, and many other factors. A fishing lure, sometimes referred to as an artificial lure, is frequently a part of such equipment and tackle.

Fishing lures are typically designed and decorated with the goal of replicating or mimicking the movement and appearance of a food source for the particular fish being sought. For example, such lure may take on the shape of a minnow, tadpole, frog, mouse, insect, salamander, another fish, or such other food source. The fisherman's hope is that by having a lure closely resembling or acting like a source of food, fish will be enticed into biting the lure.

In an effort to make the lure aesthetically realistic, a designer can use materials pigmented with the desired colors. For example, colored plastics or rubber may be used. In addition, a designer can paint or stain the external surface of the lure to achieve the desired color and marking characteristics. Decorative features such as scales, eyes, and fins may be painted onto the surface or otherwise added to the lure.

Lures can also be designed with features that make the lure realistic in a functional manner. Fins, diving planes, spinners, rattles and the like may be added in order to make the lure move and sound like a food source. Some lures may be specifically designed to operate on the water surface while others may function only when below.

Generally speaking, the lure's overall shape, the weight of the lure, and the location of the point of attachment to the fishing line can affect the swim path of the lure during retrieval. Another factor that can affect swim path is the lure's center of gravity. More specifically, the location of the center of gravity may affect the precision with which the lure can be cast as well as the movement of the lure as it is worked, trolled, or retrieved by the angler.

Some lures are able to be retrieved or trolled at greater speeds than other lures. However, at greater speeds, most lures cannot function as intended because the greater speed creates more difficulties in stabilizing the path of the fishing lure as it is moved through the water. For example, at higher speeds, many previous lures tend to roll or twist, instead of running upright. Also, at these higher speeds, the lure may tend to rise to the surface of the water and skip or ski across the surface without remaining submerged.

In the past, some fishing lures have been capable of being trolled at high speeds, such as greater than about 10 knots. However, these lures are not shaped like a bait fish or other creatures that the targeted fish would normally eat. These previously known lures are typically bullet-shaped with a metal, weighted head followed by a plastic skirt that defines several long strands of plastic. Also, these lures tend to skip across the surface and jump from wave to wave while being trolled.

As such, a need exists for a fishing lure resembling a bait fish that can be trolled or retrieved at high speeds, such as greater than 10 knots, and that runs upright and beneath the water surface while not twisting or rolling in the water.

BRIEF SUMMARY OF THE INVENTION

Objects and advantages of the invention will be set forth in part in the following description, or may be obvious from the description, or may be learned through practice of the invention.

In one embodiment, the present invention is generally directed to a fishing lure attached to a fishing line and defining a head section, a tail section, a mid-section, and a pair of opposing sides. The lure comprises a pair of wing-like fins that are each located on the opposite sides respectively and along the mid-section of the lure. A top surface is defined by each wing-like fin and is substantially triangular and substantially perpendicular to the side of the lure. The top surface is bordered by the side of the lure, a forward edge, and a back edge. A first bottom surface is defined by each of the wing-like fins. The first bottom surface forms an acute angle with the side of the lure, and is bordered by the side of the lure, the outer edge of the top surface, and a substantially curved portion. A second bottom surface is defined by each of the wing-like fins. The second bottom surface is substantially perpendicular to the side of the lure, and is bordered by the side of the lure, the substantially curved portion, and the back edge of the top surface. The substantially curved portion is formed at the intersection of the first bottom surface and the second bottom surface.

In one embodiment, the opposing sides taper towards one another and merge into the tail section. The tail section defines a terminal end of the lure. The tail section widens in a direction from the mid-section to the tail section.

In one embodiment, the fishing lure further comprises a diving element located toward the head section of the lure. For example, in one embodiment, the diving element is a weight located within the head section of the lure. In one embodiment, the weight defines an internal aperture that extends through the weight from a first end to a second end. The weight is configured to receive an eyelet of a hook into the internal aperture through the second end and to receive the fishing line into the internal aperture through the first end.

In one embodiment, the fishing lure comprises a plastic material, such as a soft, flexible plastic material. For example, in one embodiment, the fishing lure can comprise a polyvinyl chloride.

In another embodiment, the present invention is generally directed to a winged fishing lure capable of remaining submerged and upright in water when trolled. The winged fishing lure comprises a lure body and a pair of wing-like fins. The lure body defines a head section, a tail section, a lower section, and a pair of side surfaces. A pair of wing-like fins are mounted onto each of the side sections of the lure body respectively. Each wing-like fins defines a top surface and a bottom surface. The top surfaces are substantially perpendicular to their respective side surfaces and extend in a direction from the head section to the tail section while curving slightly toward the lower section of the lure body. The bottom surfaces extend in a direction from the head section to the tail section and have a leading portion and a trailing portion. The leading portions form a first acute angle with a respective side surface. The trailing portions are generally perpendicular to a respective side surface and are generally arcuate in shape.

In yet another embodiment, the present invention is generally directed toward a fishing lure for attachment to a fishing line that comprises a lure body, a pair of stabilizers, and a tail fin. The lure body defines a head section, a lower section, two side sections, and a tail section. The side sections and the lower section taper together towards said tail section. One stabilizer is located on each side section of the lure body. Each stabilizer defines a top surface, a first bottom surface, and a second bottom surface. The top surfaces are substantially planar and substantially perpendicular to the side section, and are bordered by the side section, a leading edge, and a trailing edge. The first bottom surfaces are substantially arcuate to the side section, and are bordered by the side section, the outer edge of the top surface, and a substantially arcuate line. The second bottom surfaces are substantially arcuate to the first bottom surface and the top surface, and are bordered by the side section, the arcuate line and the back edge. A tail fin is defined by the tail section of the lure body and has a terminal end. The tail fin increases in width towards the terminal end.

In yet another embodiment, the present invention is generally directed toward a fishing lure for attachment to a fishing line, the lure defining a head section, a tail section, a mid-section, and a pair of opposing sides. The lure comprises a pair of wing-like fins, such that each of the wing-like fins are located on the opposite sides respectively and along the mid-section of the lure. Each wing-like fin defines a top surface, a leading surface, and a trailing surface. The top surfaces are generally perpendicular to their respective side surfaces. The leading surfaces are generally acute to their respective side surfaces. The trailing surfaces are generally acute to their respective side surfaces. The leading and trailing surfaces intersect along a rounded edge.

Additional objects and advantages of the present subject matter are set forth in, or will be apparent to, those of ordinary skill in the art from the detailed description herein. Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which includes and makes reference to the appended figures, in which:

FIG. 1 is a perspective view of an exemplary embodiment of the winged fishing lure according to the present invention;

FIG. 2 is another perspective view taken from the bottom of the fishing lure of the exemplary embodiment of FIG. 1;

Figure 3:
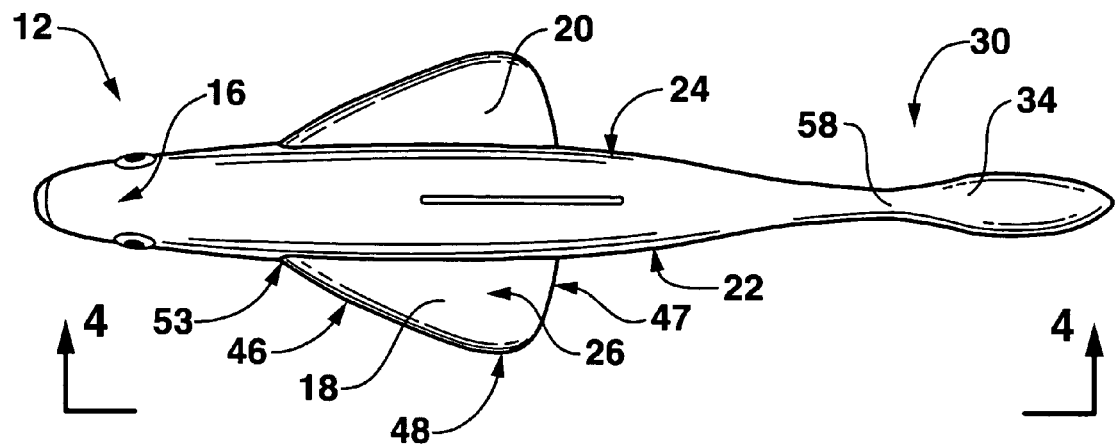
FIG. 3 is a top view of the exemplary embodiment of FIG. 1.

Repeat use of reference characters throughout the present specification and appended drawings is intended to represent the same or analogous features or elements of the invention.

DETAILED DESCRIPTION

The present application generally provides for a fishing lure having a wing-like structure on each side of the fishing lure's body. In order to fully understand the advantages of the present disclosure, FIGS. 1-4 will be explained in greater detail as exemplary embodiments of the present invention. Each example is provided by way of explanation of the invention, and not meant as a limitation of the invention. For example, features illustrated or described as part of one embodiment may be used with another embodiment to yield still a further embodiment. In fact, it will be apparent to those skilled in the art that various modifications and variations can be made in the present invention without departing from the scope or spirit of the invention.

As shown in the exemplary embodiment depicted in FIG. 1, lure 10 comprises lure body 12 that contains weight 14 located within the head section 16 of lure body 12. As better shown in FIG. 3, a pair of wing-like fins 18 and 20 are positioned along each side section 22 and 24, respectively, of lure body 12. The pair of wing-like fins 18 and 20 are positioned in the mid-section of lure body 12 generally between head section 16 and tail section 30.

Figure 4:
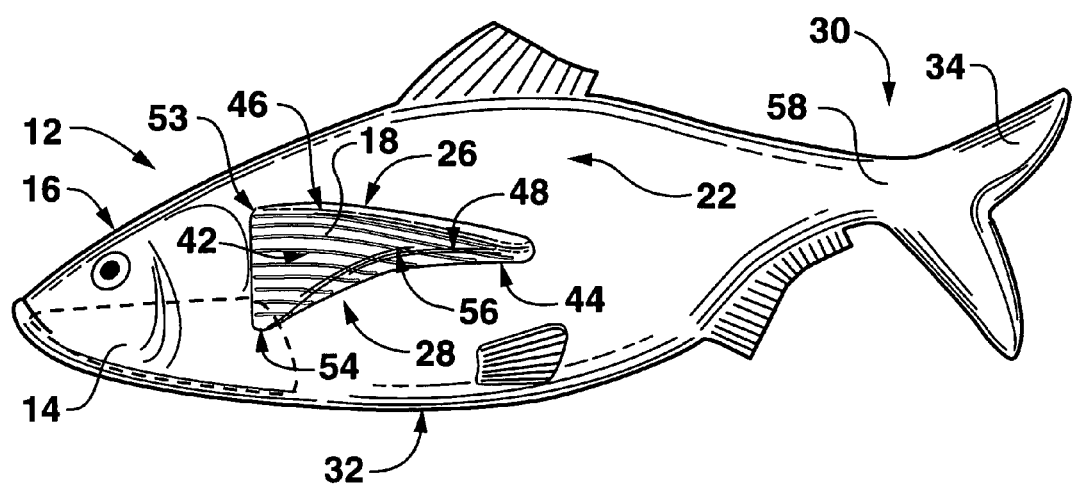
FIG. 4 is a side view of the exemplary embodiment of FIG. 1.

In the exemplary embodiment depicted, each wing-like fin 18 and 20 is positioned along a respective side section 22 and 24 to stabilize the lure body 12 and keep lure body 12 upright while being retrieved or trolled through the water. Referring to wing-like fin 18 as an example, fin 18 defines a top surface 26 and a bottom surface 28. When viewed from above lure body 12, as in FIG. 3, top surface 26 defines a substantially triangular shaped surface with rounded outer corner 48. Top surface 26 is substantially perpendicular to side section 22 and is bordered by side section 22, forward edge 46 and trailing edge 47. Top surface 26 generally follows a plane that is perpendicular to the length of the lure body 12 and extends generally in a direction from the head section 16 towards the tail section 30 of lure body 12. As seen in FIGS. 1, 2, and 4, top surface 26 curves slightly toward the lower section 32 of lure body 12.

Bottom surface 28 of wing-like fin 18 generally curves or twists as it moves in a direction from the head section 16 towards the tail section 30 of lure body 12. Following bottom surface 28 in a direction from the head section 16 towards the tail section 30, bottom surface 28 forms an acute angle with side section 22, extends along forward edge 46, and twists along an arcuate line 56 to become substantially parallel to top surface 26 at back edge 47. This twist occurs at an angle offset from the longitudinal axis of the lure body 12.

More specifically, bottom surface 28 generally comprises two nearly distinct surfaces: a first bottom surface 42 and a second bottom surface 44. First bottom surface 42 is substantially arcuate to top surface 26. First bottom surface 42 defines a substantially triangular surface, bordered by side section 22, that extends away from lure body 12 following the forward edge 46 of top surface 26. First bottom surface 42 contacts top surface 26 at forward edge 46 and comes to a point at the rounded corner 48. Arcuate line 56 defines the bottom edge of first bottom surface 42. The meeting of the first bottom surface 42 and second bottom surface 44 along arcuate line 56 is where the bottom surface 28 is described above as twisting along the length of bottom surface 28.

As best shown in FIG. 2, second bottom surface 44 generally is generally a curved surface having a substantially triangular shape defined between arcuate line 56, side section 22, and back edge 47. As best depicted in the exemplary embodiment of FIG. 4, the profile of second bottom surface 44 is curved and generally starts at bottom point 54 and extends towards tail section 30. Second bottom surface 44 remains substantially perpendicular to side section 22 throughout the length of second bottom surface 44.

The shape and design of wing-like fins 18 and 20, as shown in the exemplary embodiments of FIGS. 1-4 and including the design of both top surface 26 and bottom surface 28, allows the wing-like fins 18 and 20 to stabilize lure body 12 keeping lure body 12 upright while being trolled or retrieved beneath the water's surface. Also, the wing-like fins 18 and 20, along with weight 14, keep lure 10 beneath the water's surface when being trolled or retrieved, even at higher speeds. However, other shapes capable of keeping lure 10 submerged beneath the water can be used according to the present disclosure.

For example, lure 10 can be trolled or retrieved at speeds greater than about 10 knots, while still remaining submerged in the water. For example, in some embodiments, lure 10 can be trolled at speeds greater than about 12 knots while still remaining submerged beneath the surface. In one particular embodiment, lure 10 can be trolled at speeds greater than about 15 knots and still remain submerged beneath the water's surface. Also, wing-like fins 18 and 20 help lure 10 remain stabilized and track in a substantially straight path while remaining submerged and being trolled at these high speeds.

In addition to wing-like fins 18 and 20, the position of weight 14 gives lure 10 a center of gravity towards the head section 16 of lure body 12. This forward center of gravity helps keep lure 10 submerged and upright while being fished, along with wing-like fins 18 and 20. However, weight 14 is only one type of diving element that can be utilized on lure 10. Any type of diving element, including a weight, a diving plane, the positioning of leader line 40, and the like can be utilized with lure 10. For example, in other embodiments, lure 10 can dive below the surface of the water by attaching a diving plane the head section of the lure 10. Diving planes are well known in the art to be effective for keeping unweighted lures beneath the water's surface. In addition, other methods, such as the point of attachment of the fishing line 40 to the lure 10 can affect the diving tendency of the lure 10. In yet other embodiments, no diving element can be included on or within lure 10, but lure 10 can still be fished below the surface of the water by use of a down rigger ball releasably attached to fishing line 40.

Tail section 30 of lure body 12 defines a tail-fin 34 that adds more life-like movement to lure 10 while being fished. As best shown in the exemplary embodiment of FIG. 3, tail-fin 34 is wider than the point 58 where side sections 22 and 24 and lower section 32 taper together and merge with tail section 30. In this embodiment, the tail section 30 increases in width towards the terminal end of the tail section 30. While being trolled or retrieved through the water, tail-fin 34 causes the tail section 30 of lure body 12 to move side-to-side, creating a life-like swimming motion for lure 10.

As shown in the exemplary embodiment of FIG. 1, lure 10 further comprises hook 36 connected to leader line 40 at eyelet 38. Hook 36 extends from inside weight 14 and out of lower section 32 of lure body 12. Leader line 40 can be connected to eyelet 38 by any means, such as, for example, tied or crimped. However, other shapes and sizes of hooks can be used with lure 10, including double and treble hooks. Also, hook 36 can be positioned in other areas and by other methods on lure 10.

The exemplary embodiments depicted in FIGS. 1-4 show lure body 12 to be shaped as a bait fish. As such, lure 10 can be designed to resemble bait fish or other aquatic species that are typical food sources for the targeted fish. Also, lure body 12 can include various ornamental designs, such as eyes, fins, scales, coloring, and the like. In fact, lure body 12 can be shaped to resemble many different types of bait fish while still remaining within the scope of the present disclosure. However, in other embodiments, lure body 12 can take any shape that is capable of performing the same as the depicted embodiment.

While the present subject matter has been described in detail with respect to specific embodiments thereof, it will be appreciated that those skilled in the art, upon attaining and understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A fishing lure for attachment to a fishing line, the fishing lure defining a head section, a tail section, a mid-section, and a pair of opposing sides, the fishing lure comprising:

a pair of wing-like fins configured to keep the fishing lure upright while being trolled or retrieved under water, each said wing-like fin being located on the opposing sides respectively and along the mid-section of the lure;

a top surface defined by each said wing-like fin, said top surface being substantially triangular and substantially perpendicular to the respective side of the lure, said top surface being bordered by the respective side of the lure, a forward edge, and a back edge;

a first bottom surface defined by each of said wing-like fins, said first bottom surface forming an acute angle with the respective side of the lure, said first bottom surface being bordered by the side of the lure, said forward edge of said top surface, and a substantially curved portion, wherein said first bottom surface defines a triangular surface tapering in width in a direction from the head section to the tail section; and a second bottom surface defined by each of said wing-like fins, said second bottom surface being substantially perpendicular with the respective side of the lure, said second bottom surface being bordered by the respective side of the lure, said substantially curved portion, and said back edge of said top surface; wherein said substantially curved portion is formed at the intersection of said first bottom surface and said second bottom surface.

2. A fishing lure as in claim 1, wherein the opposing sides taper towards one another and merge into the tail section, the tail section defining a terminal end of the lure, and wherein the tail section widens in direction from the mid-section towards said terminal end.

3. A fishing lure as in claim 1 further comprising a diving element located toward the head section of the lure.

4. A fishing lure as in claim 3, wherein said diving element is a weight located within the head section of the lure.

5. A fishing lure as in claim 1, wherein the fishing lure is comprised of a plastic material.

6. A fishing lure as in claim 5, wherein said plastic material is a soft, flexible plastic material.

7. A fishing lure as in claim 1, wherein both said first bottom surface and said second bottom surface are triangular.

8. A fishing lure for attachment to a fishing line, the fishing lure defining a head section, a tail section, a mid-section, and a pair of opposing sides, the fishing lure comprising:
- a pair of wing-like fins configured to keen the fishing lure upright while being trolled or retrieved under water, each said wing-like fin being located on the opposing sides respectively and along the mid-section of the lure;
- a top surface defined by each said wing-like fin, said top surface being substantially triangular and substantially perpendicular to the respective side of the lure, said top surface being bordered by the respective side of the lure, a forward edge, and a back edge:
- a first bottom surface defined by each of said wing-like fins, said first bottom surface forming an acute angle with the respective side of the lure, said first bottom surface being bordered by the respective side of the lure, said forward edge of said top surface, and a substantially curved portion; and
- a second bottom surface defined by each of said wing-like fins, said second bottom surface being substantially perpendicular with the respective side of the lure, said second bottom surface being bordered by the respective side of the lure, said substantially curved portion, and said back edge of said top surface; wherein said substantially curved portion is formed at the intersection of said first bottom surface and said second bottom surface, and wherein said substantially curved portion forms an arcuate line that extends from said respective side to said top surface at an intersection of said forward edge and said back edge.

9. A fishing lure as in claim 8 further comprising a weight located within the head section of the lure body.

10. A fishing lure for attachment to a fishing line, the fishing lure comprising:
- a lure body defining a head section, a tail section, a mid-section, and a pair of opposing sides;
- a weight located within the head section of the lure body; and
- a pair of wing-like fins configured to keep the fishing lure upright while being trolled or retrieved under water, one wing-like fin being located on each opposing side and along the mid-section of the lure, wherein each wing-like fin comprises a top surface, a first bottom surface, and a second bottom surface,
- wherein the top surface is substantially perpendicular to the respective side of the lure, the top surface being substantially triangular and bordered by the respective side of the lure, a forward edge, and a back edge,
- wherein the first bottom surface forms an acute angle with the respective side of the lure, the first bottom surface defining a triangular surface tapering in size in a direction from the head section to the tail section and bordered by the respective side of the lure, said forward edge of said top surface, and an arcuate line formed at the intersection of the first bottom surface and the second bottom surface, and
- wherein the second bottom surface is substantially perpendicular with the respective side of the lure, the second bottom surface being substantially triangular and bordered by the respective side of the lure, said substantially curved portion, and said back edge of said top surface.

11. A fishing lure as in claim 10, wherein the opposing sides taper towards one another and merge into the tail section, the tail section defining a terminal end of the lure, and wherein the tail section widens in direction from the mid-section towards said terminal end.

* * * * *